United States Patent [19]

Ibsen et al.

[11] Patent Number: 4,997,505

[45] Date of Patent: Mar. 5, 1991

[54] SURFACE COATING PROCESS

[76] Inventors: Leif Ibsen, Svinget 16, DK-4840 Alslev, Denmark; Gerulf Naglitsch, Tagsta, Alsike, S-741 00 Knivsta, Sweden

[21] Appl. No.: 139,152

[22] Filed: Dec. 28, 1987

Related U.S. Application Data

[63] Continuation of Ser. No. 871,417, filed as PCT SE85/00355 on Sept. 17, 1985, published as WO86/01772 on Mar. 27, 1986, abandoned.

[51] Int. Cl.$^5$ .................. B31F 1/20; B29C 49/00; B05D 1/36
[52] U.S. Cl. .................... 156/220; 156/221; 264/284; 427/264
[58] Field of Search .............. 156/209, 219, 220, 221, 156/222, 307.4, 279, 307.7, 59, 196, 223, 290, 246, 285, 307.3, 307.5, 314; 264/284; 101/31; 427/264, 275; 428/458

[56] References Cited

U.S. PATENT DOCUMENTS

| | | | |
|---|---|---|---|
| 2,215,595 | 9/1940 | Saunders | 428/204 |
| 3,078,179 | 2/1963 | Kuhn | 428/473 |
| 3,576,689 | 4/1971 | Uraushihara | 428/167 |
| 3,584,572 | 6/1971 | Apicella | 101/31 |
| 3,912,842 | 10/1975 | Swartz | 156/220 |
| 3,943,018 | 3/1976 | Petry et al. | 156/279 |
| 3,978,258 | 8/1976 | Faust et al. | 156/209 |
| 4,029,831 | 6/1977 | Daunheimer | 427/264 |
| 4,070,435 | 1/1978 | Lewicki et al. | 156/220 |
| 4,101,698 | 7/1978 | Dunning et al. | 428/204 |
| 4,154,882 | 5/1979 | Ungar et al. | 156/219 |
| 4,167,597 | 9/1979 | Yoshida et al. | 427/409 |
| 4,275,116 | 6/1981 | Krätschmer | 428/352 |
| 4,278,728 | 7/1981 | Honda et al. | 156/79 |
| 4,297,405 | 10/1981 | Kasahara et al. | 427/264 |
| 4,369,221 | 1/1983 | Bennett | 428/467 |
| 4,520,064 | 5/1985 | Contemporary | 156/220 |
| 4,547,245 | 10/1985 | Colyer | 156/222 |
| 4,666,762 | 5/1987 | Yamamoto | 427/409 |

FOREIGN PATENT DOCUMENTS

| | | |
|---|---|---|
| 833509 | 2/1970 | Canada . |
| 1779557 | 4/1972 | Fed. Rep. of Germany . |
| 2654667 | 6/1977 | Fed. Rep. of Germany . |
| 2916723 | 10/1981 | Fed. Rep. of Germany . |
| 363995 | 11/1974 | Sweden . |

OTHER PUBLICATIONS

Vinyl Resins, pp. 38–41, Fed. Soc. Paint Tech, Apr. 1972 (unit 19).
Derwin Abstr. #77-25300y/15 for Soc Fr DE 2654667.

*Primary Examiner*—Michael W. Ball
*Assistant Examiner*—Louis Falasco
*Attorney, Agent, or Firm*—Browdy and Neimark

[57] ABSTRACT

A process for surface coating of materials with plane surfaces in which on the material with plane surface paint- and lacquer material(s) is(are) applied as wet paint in one or several layers, each layer being dried (cured) separately before the application of the next layer and where the total paint layer thickness is 40–300 microns, and then a plastic sheet is applied by lamination directly on top of the hot paint surface.

6 Claims, No Drawings

SURFACE COATING PROCESS

This application is a continuation of application Ser. No. 871,417, filed as PCT SE85/00355 on Sept. 17, 1985, published as WO86/01772 on Mar. 27, 1986 now abandoned.

The invention relates to a process for surface coating of substrates with plane surfaces, such as coil or sheet materials of metals.

In the process paint- and lacquer materials are applied in one or several layers on the substrate with plane surface. This (these) layer(s) is (are) applied as wet paint layer(s), which in dried state will have a certain degree of thermoplasticity.

If several layers of paint- and lacquer materials are used, the first layer will be a primer coat, such as e.g. an epoxy-, acrylic- or phenolic paint.

As a second layer on the primer coat, a pigmented or unpigmented paint layer may be applied. Examples of such suitable paint materials are fluorocarbon dispersions (PVF), PVC-plastisols, vinyl- or latex paints. Such wet paint is dried after application.

The paints are applied according to conventional techniques, such as roller coating, spray coating, curtain coating etc. The drying is performed by conventional methods, such as IR-tubes or convection heating.

After the paint layer or layers have been dried to a state of a certain degree of thermoplasticity, a plastic sheet or foil is applied directly upon the hot paint surface.

The plastic sheet applied directly upon the hot paint surface by lamination can be of various pore-free suitable foil materials, such as PVC-sheet, PVF-sheet, thermoplastic acrylic sheet etc.

In the lamination an engraved pressure roller can be used to produce an embossing effect Thereby it is possible, due to the underlying layer or layers of paint- and lacquer material, to obtain an embossed sheet surface. These layers have a total thickness of 40–300 microns which allows such embossing.

By the surface coating process according to the invention, a surface with extraordinary hardness and wear resistance is obtained and which, as mentioned above, may be embossed. Further, by means of the surface coating process according to the present invention, a layer is obtained which provides an extraordinary corrosion protection to the underlying substrate material.

PRIOR ART

It is previously known to treat metal sheet (coil) by painting with a primer layer and apply a topcoat on top of this. However, only a limited degree of corrosion resistance of metal sheet is thereby obtained, due to a certain porosity in the layer materials.

It is also previously known to treat the surface of e.g. metal sheet by first applying an adhesive layer of 5–10 microns and then applying a plastic sheet. Even in this case, a limited corrosion resistance is obtained owing to the fact that adhesive layer is so thin. Furthermore it is not possible, as in the present invention, to emboss the plastic sheet by means of a pressure roller.

As materials with plane surfaces which can be treated with the surface coating process according to the present invention, metallic materials such as cold rolled steel, metallized steel, stainless steel, galvanized steel, aluminum etc are suitable.

In the coating of sheet metal materials, the sheet metal is preferably pretreated chemically by usual methods such as pickling, phosphatising, chromating etc.

The layer or layers of paint- and lacquer material can consist of one primer layer and a second paint layer which can be pigmented or unpigmented A suitable combination is to use a pigmented layer of optional colour and then on top of this a clear plastic sheet is applied. Thus a great variety is possible concerning the appearance of the end product, and this as mentioned above, can be further enhanced by an embossing effect obtained by means of an engraved pressure roller used in the lamination of the plastic sheet.

In said lamination the temperature of the metal sheet is from 150° up to 300° C.

As emphasized before, one of the paint layers can be omitted thus using either only one primer layer or only one paint layer without any underlying primer layer it being observed, however, that the paint layer thickness must be at least 20 microns dry film to provide necessary thickness which allows both good adhesion and possibility to emboss. As mentioned above the paint layer in its dried state must show a certain degree of thermoplasticity.

In the process according to the invention a lamination without the use of any special adhesive is attained in one and the same process and different colours, gloss degrees and surface textures can simply and cheaply be achieved without the necessity of keeping a large assortment of different plastic sheets in store.

The invention is more closely illustrated in the following examples:

EXAMPLE 1

In a conventional coil-coating line the following is applied on 0.8 mm hot galvanized steel, chemically pretreated with "Bonder 1303" (a phosphatising agent from Metallgesellschaft GmbH, West Germany): First layer: An acrylic primer ("EE212-1002 Coilon Primer" from BIFAB, Marsta, Sweden) is applied by reverse roller coat to a thickness of 6–8 microns dry film, drying/curing at 225° C. PMT (peak metal temperature) and then cooled.

Second layer: On the previous layer a pigmented polyvinylchloride plastisol paint ("FJ220-2403 Coilon Plastisol Umbra" from BIFAB, Marsta, Sweden) is applied to a thickness of 70 microns dry film by reverse roller coat, drying/curing at 205° C. PMT.

Third layer: Directly upon the previous hot layer, a clear plasticized plastic sheet of polyvinylchloride ("Type 1951" from Gislaved AB, Sweden) and a thickness of 70 microns is applied.

Embossing: After the application of the previous plastic sheet, the coated steel coil passes, without separate cooling, an embossing steel roller which produces a relief pattern and then cooling takes place.

EXAMPLE 2

The same as Example 1 with the following exception:
Third layer: As plastic sheet is used a clear polyacrylic sheet ("Type 2/1033" from Alkor GmbH, West Germany) with a thickness of 60 microns.

EXAMPLE 3

The same as Example 1 with the following exceptions:
Second layer: On the previous layer a clear (unpigmented) polyvinylchloride plastisol ("FJ220 Coilon Plastisol Clear", from BIFAB, Marsta, Sweden) is applied to a thickness of 200 microns dry film by reverse roller coat, drying/curing at 205° C. PMT.

Third layer: Directly upon the previous hot layer a soft hiding (pigmented) plastic sheet of polyvinylchloride ("Type 1951" pigmented, from Gislaved AB, Sweden) with a thickness of 75 microns is applied.

We claim:

1. A continuous method for surface coating plane metal surfaces of a sheet or coil in a coil coating line, comprising the steps of:

applying a primer coat onto a plane metal surface of a sheet or coil and drying said primer coat;

applying a layer of wet paint which is a plastisol;

drying said wet paint coating by heat to a state of a predetermined degree of thermoplasticity, the total thickness of said layers being from 40 to 300 microns;

applying a clear plastic sheet of pore-free foil material directly onto the top of said still hot paint coating and laminating, thereby forming a laminated assembly;

embossing said hot laminated assembly; and cooling said laminated embossed assembly.

2. A method according to claim 1 wherein said embossing is effected by subjecting said hot laminated assembly to an engraved pressure roller.

3. The method of claim 1, wherein said plastisol is a PVC plastisol.

4. A process according to claim 1, wherein an unpigmented paint is applied as said paint coating.

5. The method of claim 1, wherein said applying step is performed at about 150°–300° C.

6. The method of claim 1, wherein said plastisol is a PVC plastisol.

* * * * *